US008007015B2

(12) United States Patent
Coulombe

(10) Patent No.: US 8,007,015 B2
(45) Date of Patent: Aug. 30, 2011

(54) SAFETY HOOK

(76) Inventor: Don F. Coulombe, Fenwick (CA)

( * ) Notice: Subject to any disclaimer, the term of this patent is extended or adjusted under 35 U.S.C. 154(b) by 0 days.

(21) Appl. No.: 11/703,418

(22) Filed: Feb. 7, 2007

(65) Prior Publication Data

US 2008/0184540 A1    Aug. 7, 2008

(51) Int. Cl.
*E05C 19/00* (2006.01)
(52) U.S. Cl. ........... 292/1; 292/113; 24/600.1; 24/601.1
(58) Field of Classification Search .................. 292/113; 24/599.5, 584.1–600.9
See application file for complete search history.

(56) References Cited

U.S. PATENT DOCUMENTS

| | | | |
|---|---|---|---|
| 470,980 A | 3/1892 | Dickey et al. | |
| RE16,613 E | 5/1927 | Moody et al. | |
| 1,626,866 A | 5/1927 | Neilson | |
| 1,879,167 A | 9/1932 | Freysinger | |
| 1,949,608 A * | 3/1934 | Johnson | 24/599.5 |
| 1,964,428 A | 6/1934 | Thomas | |
| 2,490,931 A * | 12/1949 | Thompson | 24/599.5 |
| 3,317,972 A * | 5/1967 | Harley | 24/599.4 |
| 3,575,458 A | 4/1971 | Crook et al. | |
| 3,831,994 A | 8/1974 | Martin | |
| 3,847,423 A * | 11/1974 | Gley | 292/113 |
| 3,936,082 A * | 2/1976 | Swanson | 292/113 |
| 4,062,092 A * | 12/1977 | Tamada et al. | 24/599.4 |
| 4,122,585 A * | 10/1978 | Sharp et al. | 294/82.2 |
| 4,539,732 A | 9/1985 | Wolner | |
| 4,977,647 A * | 12/1990 | Casebolt | 24/599.5 |
| 5,257,441 A * | 11/1993 | Barlow | 24/599.5 |
| 5,361,464 A | 11/1994 | Bunnell | |
| 5,438,736 A * | 8/1995 | Terada et al. | 24/599.8 |
| 5,579,564 A * | 12/1996 | Rullo et al. | 24/599.5 |
| 5,735,025 A * | 4/1998 | Bailey | 24/600.1 |
| 5,896,630 A * | 4/1999 | Smith et al. | 24/600.1 |
| 5,927,431 A | 7/1999 | Klein | |
| 6,161,264 A | 12/2000 | Choate | |
| 6,283,524 B1 | 9/2001 | Simond | |
| 6,718,601 B1 * | 4/2004 | Choate | 24/600.2 |

(Continued)

*Primary Examiner* — Carlos Lugo
*Assistant Examiner* — Kristina R Fulton
(74) *Attorney, Agent, or Firm* — Simpson & Simpson, PLLC

(57) ABSTRACT

The present invention broadly comprises a hook including a hook body having first and second ends, the first end includes a bent portion having inner and outer surfaces and a nose, and the second end includes an opening, a release lever having a first locking means and spaced apart parallel side walls, the first locking means arranged proximate to the inner surface of the hook body and a gate having spaced apart parallel side walls, the side walls including a second locking means and, the gate arranged to engage the nose, the second locking means arranged to complimentarily engage the first locking means, wherein pivoting of the release lever about a first rotational axis disengages the first and second locking means and permits pivoting of the gate about a second rotational axis. The present invention also broadly comprises a hook including a hook body having first and second ends, the first end includes a bent portion having a nose, and the second end includes an opening, a release lever having spaced apart parallel side walls and a first locking means and a gate having spaced apart parallel side walls, each of the side walls includes a second locking means having an arcuate wall portion arranged to complimentarily engage the first locking means, the gate arranged to engage the nose, the arcuate wall portions arranged opposite and parallel each other, wherein pivoting of the release lever about a first rotational axis disengages the first and second locking means and permits pivoting of the gate about a second rotational axis.

23 Claims, 12 Drawing Sheets

U.S. PATENT DOCUMENTS

| | | |
|---|---|---|
| 6,832,417 B1 | 12/2004 | Choate |
| 7,353,572 B2 | 4/2008 | Claus |
| 7,437,806 B2 | 10/2008 | Lin |
| 7,444,723 B2 | 11/2008 | Lin |
| 2007/0062014 A1* | 3/2007 | Casebolt ............ 24/600.1 |
| 2007/0067970 A1* | 3/2007 | Claus et al. ............ 24/599.9 |
| 2008/0174130 A1 | 7/2008 | Lin |
| 2008/0185450 A1 | 8/2008 | Coulombe |
| 2008/0185848 A1 | 8/2008 | Coulombe |
| 2009/0049663 A1 | 2/2009 | Hong |

* cited by examiner

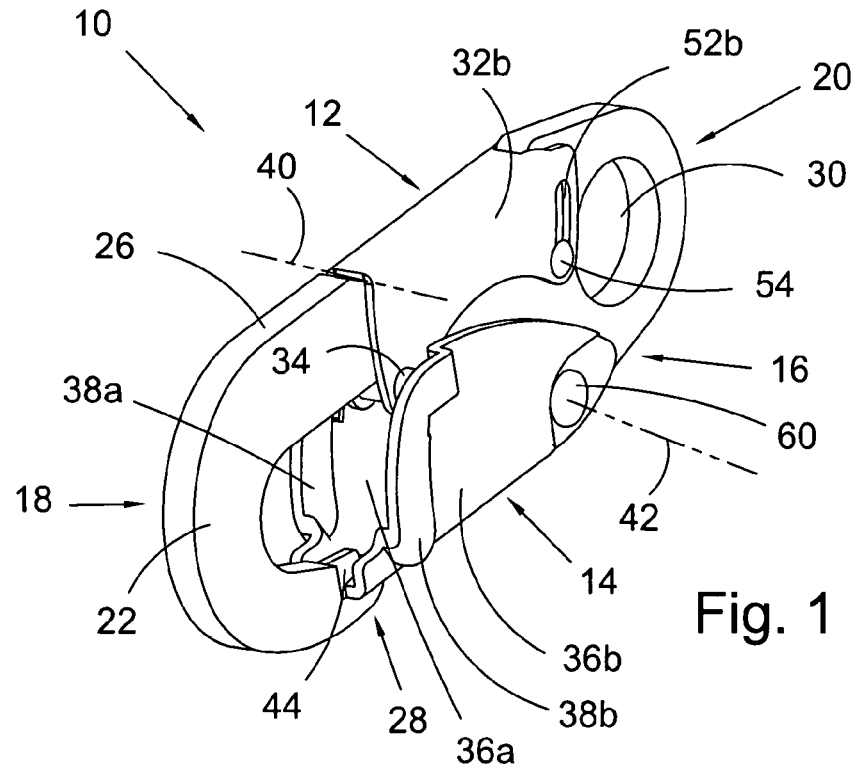
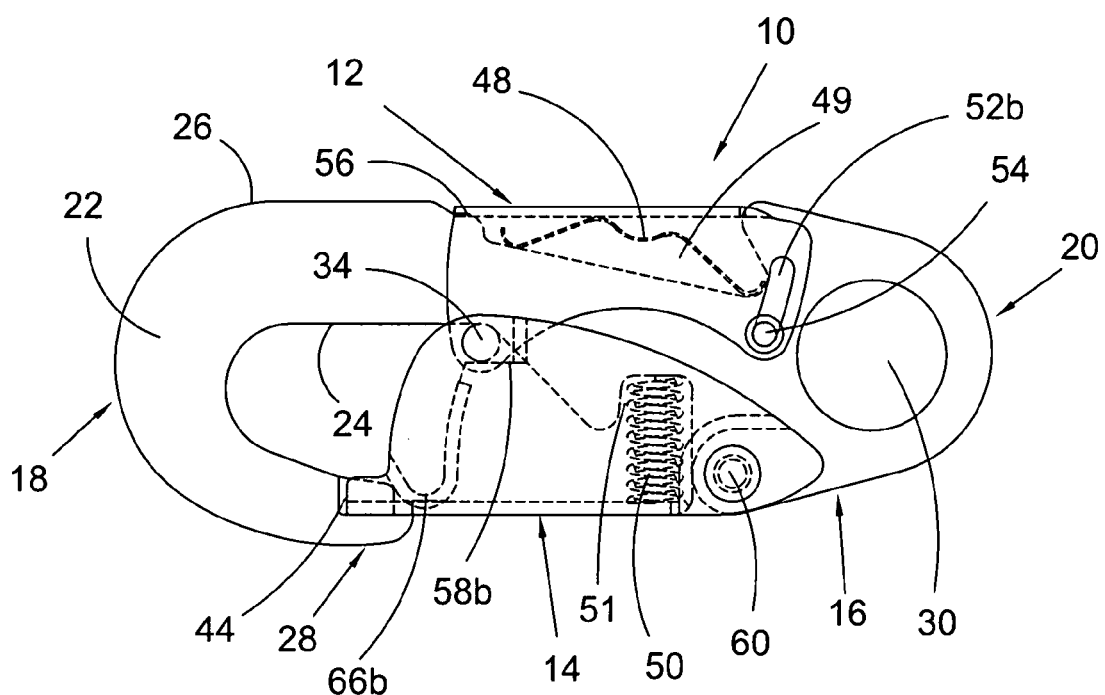
Fig. 1
Fig. 2

SAFETY HOOK

FIELD OF THE INVENTION

The invention broadly relates to hooks, more specifically to safety hooks, and even more particularly to safety hooks having increased body and gate strength.

BACKGROUND OF THE INVENTION

Federal and state regulations often require persons working at elevated heights to utilize fall-arrest equipment. Fall-arrest equipment commonly includes a body harness for attaching to a user and a lanyard for connecting to an anchorage point. Often, the final connection to the anchorage point is made with a hook or a carabiner at the end of the lanyard. Although, regardless of the type of connection, the connector must be manufactured to meet American National Standards Institute (ANSI) and Occupational Safety and Health Administration (OSHA) standards for minimum strength requirements for the hook body, gate/latch and locking mechanism. Additionally, other standards may also apply, for example, depending on the connectors intended use.

Safety hooks typically include a hook body, release lever (also known as a lock lever) and a gate. Additionally, safety hooks typically include springs and fasteners that hold the body, gate and release lever together and in a locked position. The release lever or lock lever of a hook is arranged to shift the locking mechanism away from the gate to allow the gate to open. The gate of a hook is arranged to prevent the hook from disengaging from an anchorage point, while the locking mechanism prevents the gate from opening unintentionally.

Under ideal circumstances, when a person falls, the connector, e.g., the hook, hangs vertically and the force of the fall is absorbed along the principal axis of the hook body. However, anchorage points vary greatly from specifically engineered hardware, to structural elements in buildings and fabrications, to even tree limbs. Because of the wide range of anchorage situations, and the variety of positions a person may be in when they fall relative to the anchorage point, the hook may be prevented from moving to its ideal vertical hanging position. In such situations, forces from the fall may act against the gate/latch and/or locking mechanism, which in the majority of hooks are not as strong as the hook body. Component failure and personal injury are often results of such falls, thus the need for latching mechanisms that can withstand greater forces.

Current ANSI and OSHA standards require hooks and carabiners to be self-closing, self-locking and capable of being opened only by at least two consecutive deliberate actions. Proposed new ANSI standards, e.g., Z 359.1-07ED, significantly change specifications for fall-arrest hardware. The following table summarizes recent proposed changes to the aforementioned standard:

TABLE 1

| Hardware Feature | Test description | Existing standard | Proposed Standard |
| --- | --- | --- | --- |
| Gate face | Load test for strength of gate and locking mechanism | 250 lbs | 3,600 lbs |
| Gate side | Load test for strength of gate in resisting side loads | 350 lbs | 3,600 lbs |

Hook bodies are most commonly constructed of heat treated carbon steel, forged or stamped, while the gate and lock lever are often constructed of stamped mild steel. However, one of ordinary skill in the art will recognize that other materials may also be used depending upon the desired strength of the assembled hook. For example, safety hooks that do not need to meet the described ANSI test standards may have molded plastic bodies, gates or release levers. Most prior art hooks act on the principal that force applied to the gate and lock, i.e., gate face load, is resisted by the strength of the gate and lock lever material and the rivets or fasteners they pivot on. Depending on the configuration of the mechanism, the force applied against the gate face, and transferred to the lock, can be multiplied by the 'lever nature' of both the gate and the lock lever, so that 3,600 lbs can become 5,000+ lbs. Due to the configuration of these mechanisms, much of this load is applied against the rivets or fasteners of the gate and lock lever.

Some gates of prior art hooks can withstand 3,600 lb gate side loads, while others can be easily modified to withstand these loads, by constructing existing gates out of thicker heat treated materials, however such modifications increase cost, size and/or weight of a hook. Contrarily, gates are not so easily modified to withstand face loads, i.e., loads applied to the face of the gate which transmit from the gate to the locking mechanism and lock lever and subsequently to the rivets or fasteners on which they pivot and are mounted to the body with. It is impractical or simply impossible to make all elements, of existing hook designs, bigger, thicker or of stronger materials to withstand such loads.

The gates of most carabiners are considerably stronger than the gates of most hooks. The locking mechanism of a carabiner is located in the barrel of the gate, and requires a sliding and/or twisting motion to release the lock and open the gate. This mechanism is relatively expensive to produce and can be difficult to unlock with cold hands or with gloves on and often requires two hands to operate. Contrarily, hooks have relatively simple mechanisms consisting of a gate and a 'lock-lever' and can be operated with one hand. Hooks are far more popular because they are easier to use and much cheaper to manufacture.

Thus, there is a long-felt need for a safety hook capable of withstanding elevated, gate face and side loads. There is a further long-felt need for a safety hook having the foregoing characteristics which functions easily and is economical and simple to manufacture.

BRIEF SUMMARY OF THE INVENTION

The present invention broadly comprises a hook including a hook body having first and second ends, the first end includes a bent portion having inner and outer surfaces and a nose, and the second end includes an opening; a release lever having spaced apart parallel side walls and a first locking means, the first locking means arranged proximate to the inner surface of the hook body; and, a gate having spaced apart parallel side walls, the side walls including a second locking means, the gate arranged to engage the nose, the second locking means arranged to complimentarily engage the first locking means, wherein pivoting of the release lever about a first rotational axis disengages the first and second locking means and permits pivoting of the gate about a second rotational axis. In some embodiments, the first locking means is arranged to contact the inner surface of the hook body, while in other embodiments, the first locking means is arranged to contact the inner surface of the hook body when a force is applied to the gate to pivot the gate about the second rotational axis.

In still other embodiments, the nose further includes a recessed tongue, while the gate further includes a notch arranged to complimentarily engage the recessed tongue. In yet other embodiments, the hook further includes a release lever spring arranged to bias the release lever to engage the first and second locking means, while in yet other embodiments, the hook further includes a gate spring arranged to engage the gate and the nose. In some embodiments, each of the release lever spaced apart parallel side walls further includes an arcuate slot, the arcuate slots arranged opposite each other and the hook body further includes a double ended rivet arranged through the arcuate slots. In some of such embodiments, a point of contact between the release lever and the outer surface of the bent portion is located along the first rotational axis. In other embodiments, the release lever is pivotally attached to the hook body by a fastening means, and in some embodiments, the fastening means is a pin, while in other embodiments, the fastening means is a rivet.

In yet other embodiments, the second locking means includes an arcuate slot disposed in each of the gate spaced apart parallel walls, the arcuate slots arranged opposite each other and each of the arcuate slots includes a bearing surface arranged for locking engagement with the first locking means. In some embodiments, the first locking means is a double ended rivet disposed through the arcuate slots, while in other embodiments, the first locking means is a double ended rivet disposed through the arcuate slots, the double ended rivet further includes a bearing sleeve. In still yet other embodiments, the second locking means includes an arcuate elevated portion disposed in each of the gate spaced apart parallel walls, the arcuate elevated portions arranged opposite each other and each of the arcuate elevated portions includes a bearing surface arranged for locking engagement with the first locking means. In some embodiments, the first locking means is a pin.

In further embodiments, the gate is pivotally attached to the hook body by a fastening means. In some embodiments, the fastening means is a pin, while in other embodiments, the fastening means is a rivet.

The present invention may also broadly comprise a hook including a hook body having first and second ends, the first end includes a bent portion having a nose, and the second end includes an opening; a release lever having spaced apart parallel side walls and a first locking means; and, a gate having spaced apart parallel side walls, each of the side walls includes a second locking means including an arcuate wall portion arranged to complimentarily engage the first locking means, the gate arranged to engage the nose, the arcuate wall portions arranged opposite and parallel each other, wherein pivoting of the release lever about a first rotational axis disengages the first and second locking means and permits pivoting of the gate about a second rotational axis. In some embodiments, the first locking means is a double ended rivet disposed through the release lever spaced apart parallel side walls, while in other embodiments, the first locking means is a double ended rivet disposed through the release lever spaced apart parallel side walls, the double ended rivet further including a bearing sleeve, and in still further embodiments the first locking means is a pin disposed between elevated portions of each of the release lever spaced apart parallel side walls.

It is a general object of the present invention to provide a safety hook capable of withstanding elevated tensile, gate and side loads.

It is another general object of the present invention to provide a safety hook which is simple and economical to manufacture.

It is a further object of the present invention to provide a safety hook which includes a locking mechanism that is simple and easy to operate.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 1 is a perspective view of a first embodiment of a present invention safety hook;

FIG. 2 is a side elevational view of the safety hook shown in FIG. 1 showing internal features in broken lines;

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred embodiments, it is to be understood that the invention as claimed is not limited to the disclosed embodiments.

Furthermore, it is understood that this invention is not limited to the particular methodology, materials and modifications described and as such may, of course, vary. It is also understood that the terminology used herein is for the purpose of describing particular embodiments only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 3:
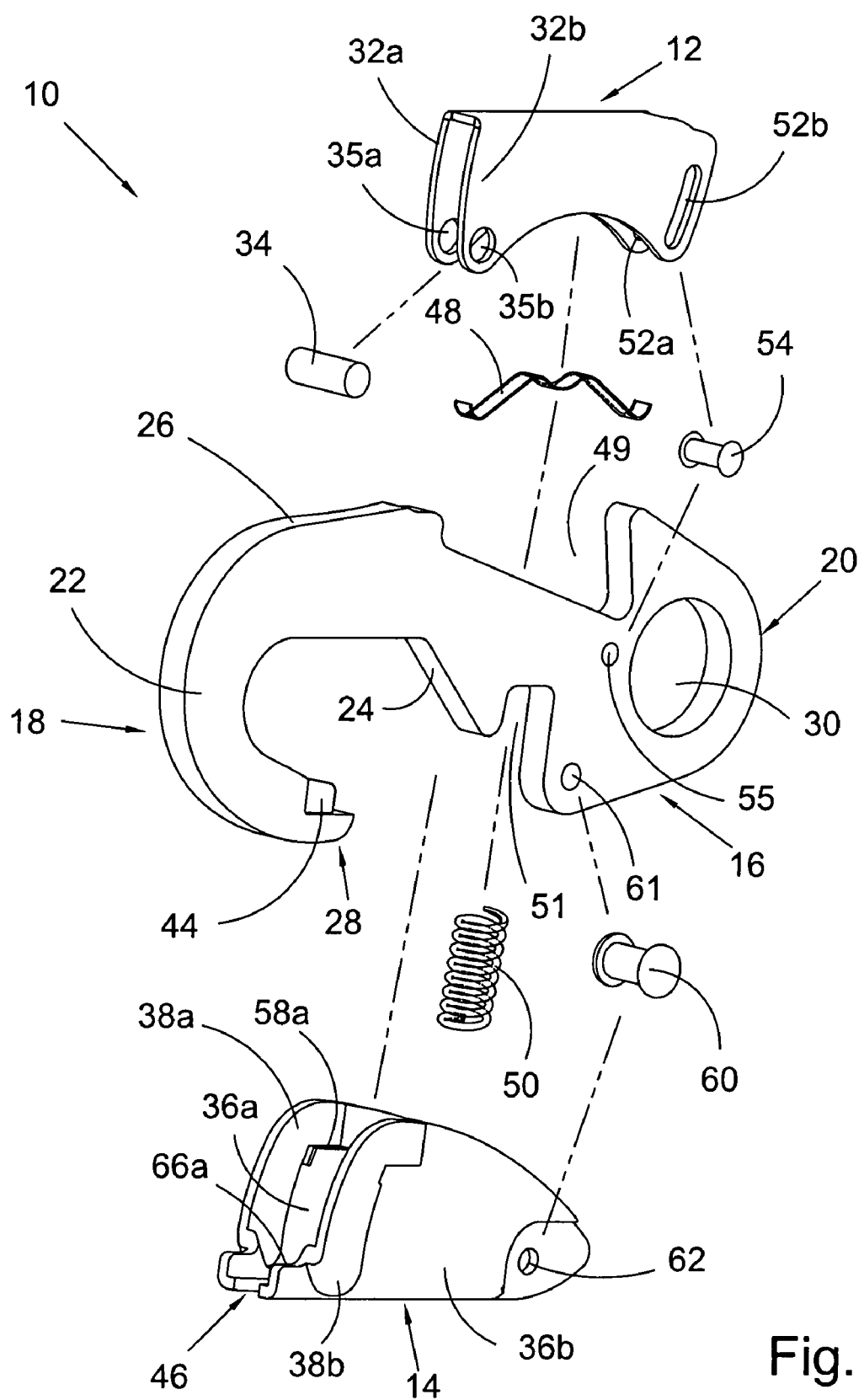
FIG. 3 is an exploded perspective view of the safety hook shown in FIG. 1.
Figure 4:
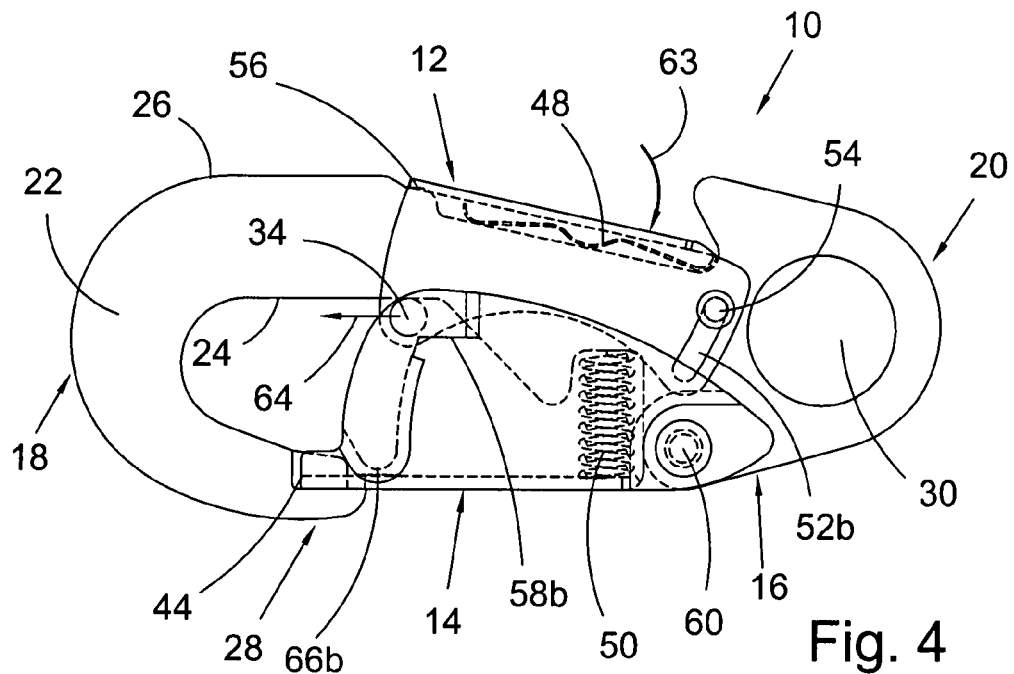
FIG. 4 is a side elevational view of the safety hook shown in FIG. 1 showing internal features in broken lines and having a release lever in an unlocked position.
Figure 5:
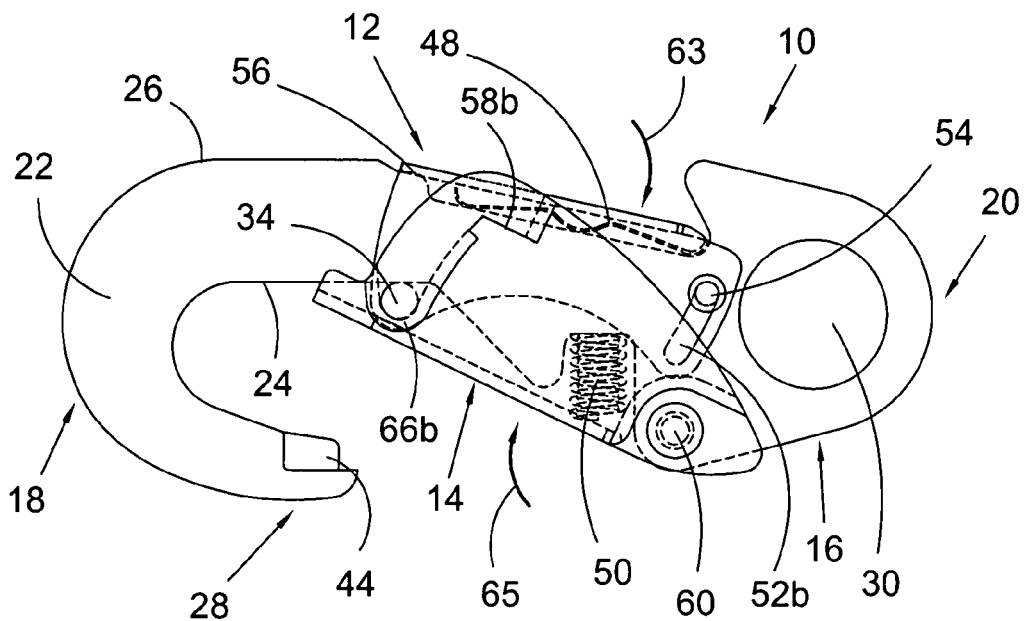
FIG. 5 is a side elevational view of the safety hook shown in FIG. 1 showing internal features in broken lines and having a release lever in an unlocked position and a gate in an open position.

Adverting now to the figures, FIGS. 1 through 5 show a first embodiment of present invention safety hook 10. More specifically, FIG. 1 shows a perspective view of safety hook 10, FIG. 2 shows a side elevational view of safety hook 10 showing internal features in broken lines, FIG. 3 shows an exploded perspective view of safety hook 10, while FIG. 4 shows a side elevational view of safety hook 10 showing internal features in broken lines and having release lever 12 in an unlocked position and FIG. 5 shows a side elevational view of safety hook 10 showing internal features in broken lines and having release lever 12 in an unlocked position and gate 14 in an open position. Safety hook 10 comprises hook body 16 having first and second ends, 18 and 20, respectively. First end 18 comprises bent portion 22 having inner and outer surfaces 24 and 26, respectively, and nose 28, while second end 20 comprises opening 30. Release lever 12 includes spaced apart parallel side walls 32a and 32b, and pin 34 disposed within opening 35a and 35b. In the embodiment shown in FIGS. 1 through 5, pin 34 forms a first locking means and is arranged to contact inner surface 24 of hook body 16. However, as described infra, pin 34 may also be arranged proximate to inner surface 24. Gate 14 includes spaced apart parallel side walls 36a and 36b and each of side walls 36a and 36b includes arcuate elevated portions 38a and 38b. In this embodiment, arcuate elevated portions 38a and 38b form a second locking means. Gate 14 is arranged to engage nose 28, while arcuate elevated portions 38a and 38b are arranged to complimentarily engage pin 34. In other words, elevate portions 38a and 38b not only engage pin 34 for locking purposes, but also secure pin 34 within release lever 12 and gate 14, i.e., captures pin 34 within gate 14. In this embodiment, pivoting of release lever 12 about first rotational axis 40 disengages pin 34 and arcuate elevated portions 38a and 38b, and permits pivoting of gate 14 about second rotational axis 42.

Although in the embodiment shown in FIGS. 1 through 5, pin 34 is arranged to contact inner surface 24 of hook body 16, one of ordinary skill in the art will appreciate that other configurations are also possible, e.g., pin 34 may be proximate to inner surface 24 or pin 34 may be brought into contact with inner surface 24 upon applying a force to gate 14 thereby causing gate 14 to pivot about second rotational axis 42 and thereafter pin 34 to press against inner surface 24. Thus, due in part to design tolerances and manufacturing capabilities, pin 34 may be arranged to contact inner surface 24 or may alternatively be arranged proximate to inner surface 24. Such variations in the position of pin 34 relative to inner surface 24 are within the spirit and scope of the claimed invention. Furthermore, in the embodiment shown in FIGS. 1 through 5, nose 28 further comprises recessed tongue 44 and gate 14 further comprises notch 46 arranged to complimentarily engage recessed tongue 44. Hook 10 further comprises release lever spring 48 positioned within opening 49 and arranged to bias release lever 12 to engage pin 34 and arcuate elevated portions 38a and 38b, and gate spring 50 positioned within opening 51 and arranged to engage gate 14 and nose 28. Release lever spaced apart parallel side walls 32a and 32b further comprise arcuate slots 52a and 52b, respectively. Arcuate slots 52a and 52b are arranged opposite each other and hook body 16 further comprises double ended rivet 54 disposed within opening 55 and arranged through arcuate slots 52a and 52b. Point of contact 56 formed between release lever 12 and outer surface 26 of bent portion 22 is located along first rotational axis 40.

Arcuate elevated portions 38a and 38b, arranged opposite each other, include bearing surfaces 58a and 58b arranged for locking engagement with pin 34. In this embodiment, gate 14 is pivotally attached to hook body 16 by fastening means 60, i.e., a rivet, disposed through openings 61 and 62. As one of ordinary skill in the art will recognize, fastening means 60 may take various forms, e.g., a press fit pin, a rivet with bearing sleeve or a nut and bolt combination, and such variations are within the spirit and scope of the claimed invention.

The following discussion of the operation of safety hook 10 is perhaps best understood in view of FIGS. 2, 4 and 5. In a locked position (see FIG. 2), release lever 12 is biased by spring 48 against rivet 54 and point of contact 56, thereby engaging pin 34 between inner surface 24 and bearing surfaces 58a and 58b. Thus, forces applied to gate 14 are transferred through gate 14 to bearing surfaces 58a and 58b, from surfaces 58a and 58b to pin 34, and lastly from pin 34 to inner surface 24. In such a configuration, pin 34 is located directly across from gate face loads and thus there is no multiplication of forces due to lever effects of gate 14. Therefore, substantially all forces are transmitted to hook body 16 via pin 34, and not through fastening means 60. As one of ordinary skill in the art will recognize, such a configuration will permit constructing fastening means 60 from less expensive materials or from a steel rivet of modest diameter as its overall strength is not an issue. One of ordinary skill in the art will also recognize that some hooks, e.g., large hooks, do not permit the placement of pin 34 directly across from the load point, and in those instances, some load will be transmitted to hook body 16 via fastening means 60.

As described supra, release lever 12 is pivoted about first rotational axis 40 to release the locking mechanism and thereby permit pivoting of gate 14, i.e., placing safety hook 10 in an unlocked position (see FIG. 4). More specifically, as release lever 12 is pivoted according to arcuate unidirectional arrow 63, pin 34 is displaced according unidirectional arrow 64 along inner surface 24. It should be noted that in some embodiments, pin 34 will move according to an arc formed by the movement of pin 34 about first rotational axis 40, while in other embodiments, pin 34 will only contact inner surface 24 when a load is applied to gate 14, as described supra. Upon pivoting release lever 12 through its full range of motion, i.e., the limit set forth by arcuate slots 52a and 52b, pin 34 no longer contacts bearing surfaces 58a and 58b, and therefore gate 14 may freely pivot about second rotational axis 42, i.e., fastening means 60, into an open position according to arcuate unidirectional arrow 65 (see FIG. 5). Also including in this embodiment are stop surfaces 66a and 66b arranged to prevent gate 14 from contacting inner surface 24, thereby preventing damage to notch 46. Although, stop surfaces 66a and 66b are included in this embodiment, one of ordinary skill in the art will recognize that such stops are not necessary in all hooks, e.g., hooks having pivoting movement of a gate limited by the gate contacting a hook body, and such variations are within the spirit and scope of the claimed invention.

Figure 6:
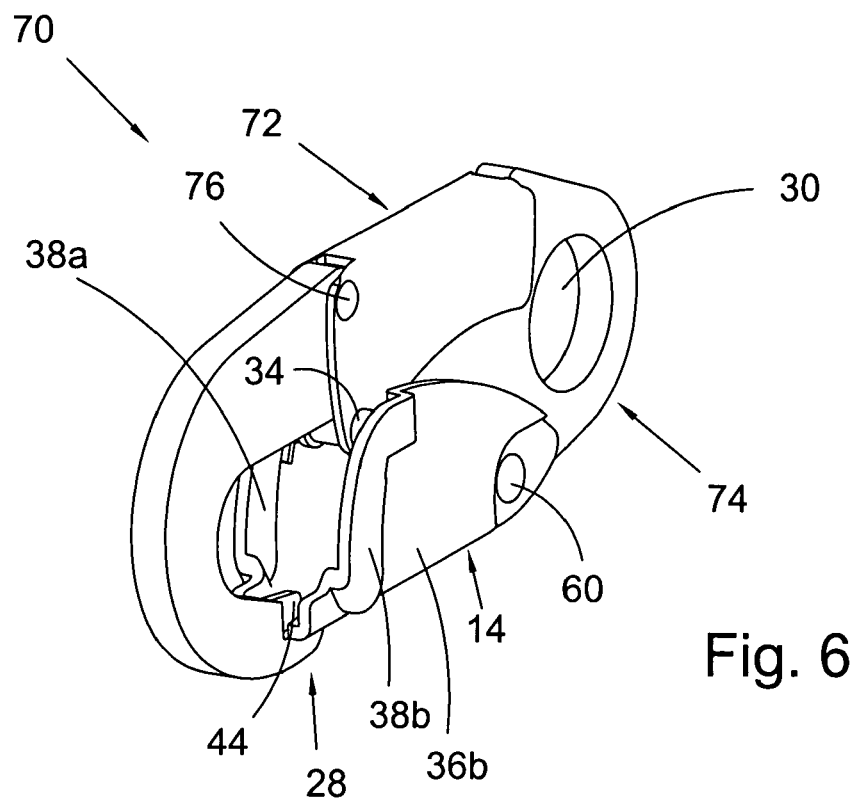
FIG. 6 is a perspective view of a second embodiment of a present invention safety hook.
Figure 7:
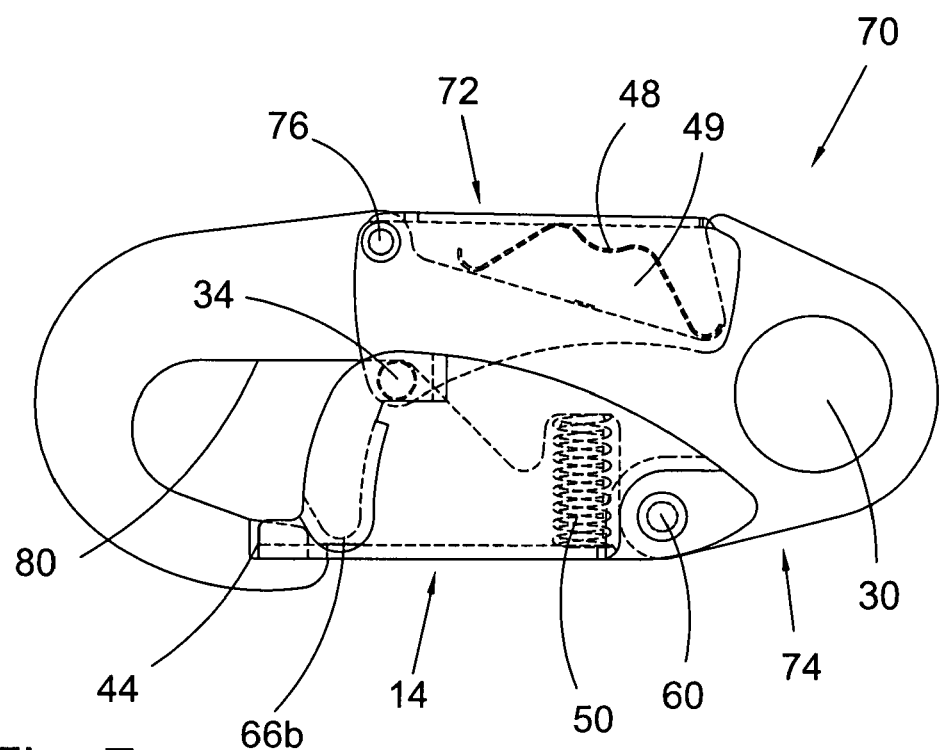
FIG. 7 is a side elevational view of the safety hook shown in FIG. 6 showing internal features in broken lines.
Figure 8:
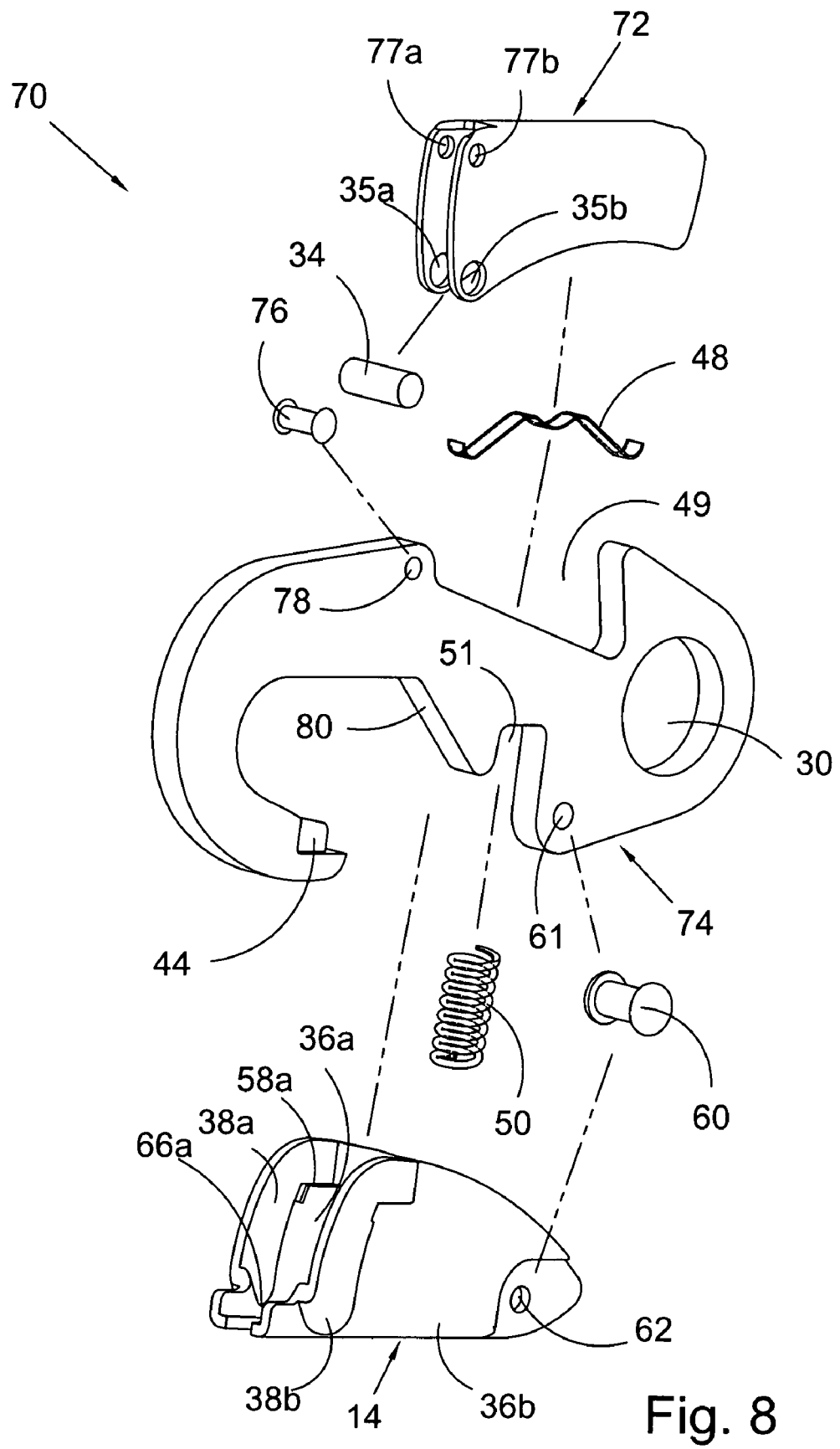
FIG. 8 is an exploded perspective view of the safety hook shown in FIG. 6.

FIGS. 6 through 8 show a second embodiment of a present invention safety hook. More specifically FIG. 6 shows a perspective view of safety hook 70, FIG. 7 shows a side elevational view of safety hook 70 showing internal features in broken lines, and FIG. 8 is an exploded perspective view of safety hook 70. In the embodiment shown in FIGS. 6 through 8, release lever 72 is pivotally attached to hook body 74 by fastening means 76 disposed through openings 77a, 77b and 78. Although in this embodiment fastening means 76 is depicted as a rivet, one of ordinary skill in the art will recognize that other fastening means are also possible, e.g., a pin, a rivet with a load bearing sleeve or a nut and bolt combination, and such variations are within the spirit and scope of the claimed invention. Furthermore, this embodiment differs from the first embodiment in that the pivoting movement of release lever 72 is controlled by fastening means 76, as opposed to point of contact 56, rivet 54 and arcuate slots 52a and 52b. In other words, release lever 72 is pivotally attached to hook body 74 by disposing fastening means 76 through openings 77a, 77b and 78. Thus, similar to the previously described embodiment, gate 14 is held in a locked position by the engagement of bearing surfaces 58a and 58b against pin 34, and subsequently pin 34 against inner surface 80; gate 14 is unlocked by pivoting release lever 72 about fastening means 76 thereby disengaging pin 34 from bearing surfaces 58a and 58b and inner surface 80; and, gate 14 is opened by pivoting gate 14 about fastening means 60.

Figure 9:
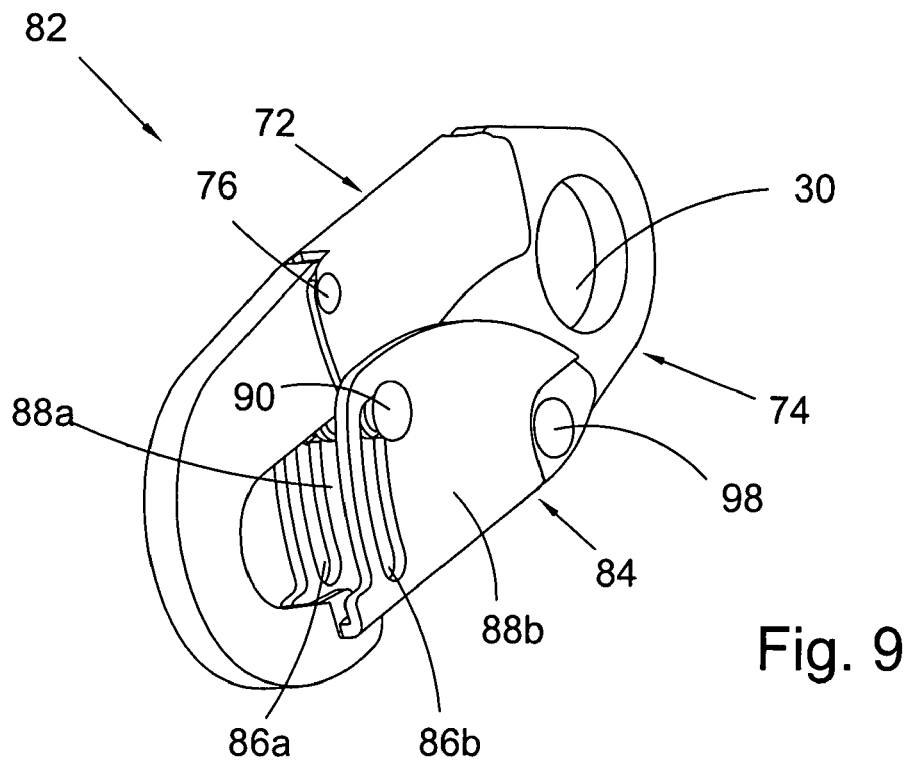
FIG. 9 is a perspective view of a third embodiment of a present invention safety hook.
Figure 10:
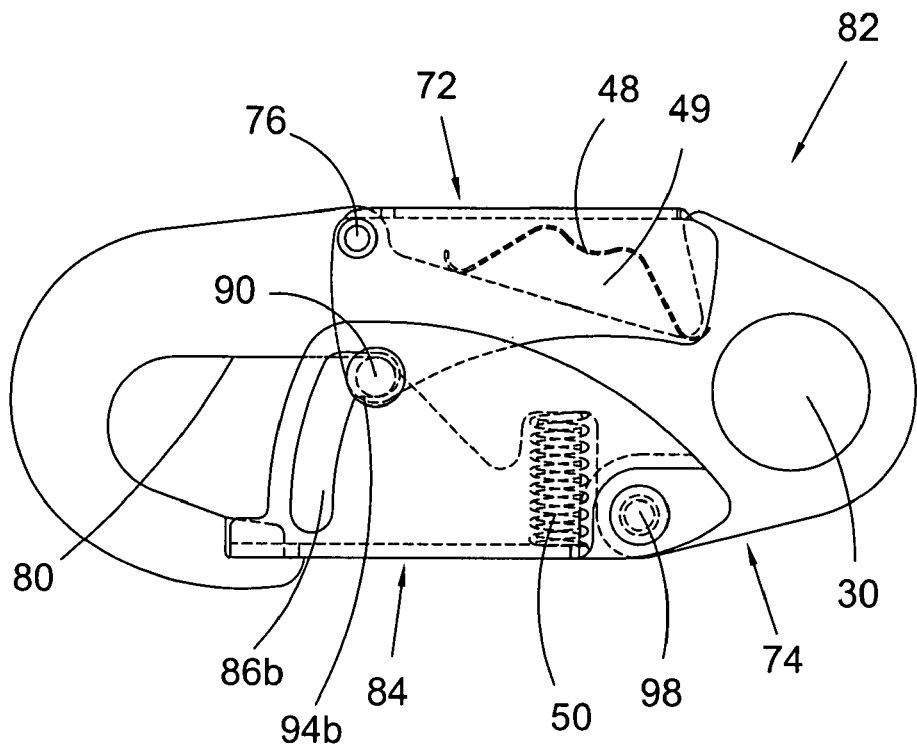
FIG. 10 is a side elevational view of the safety hook shown in FIG. 9 showing internal features in broken lines.
Figure 11:
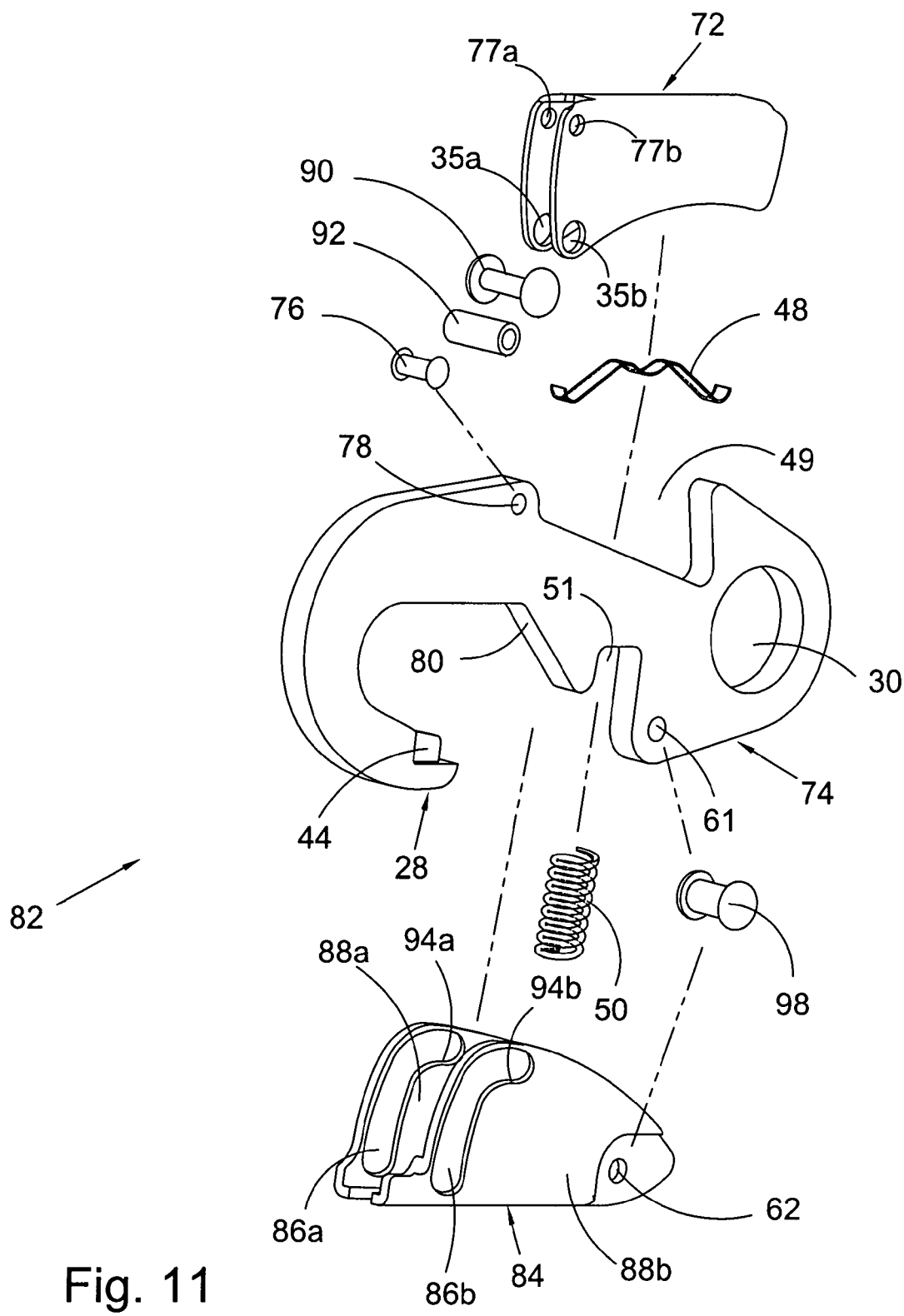
FIG. 11 is an exploded perspective view of the safety hook shown in FIG. 9.

FIGS. 9 through 11 show a third embodiment of a present invention safety hook. More specifically FIG. 9 shows a perspective view of safety hook 82, FIG. 10 shows a side elevational view of safety hook 82 showing internal features in broken lines, and FIG. 11 is an exploded perspective view of safety hook 82. In the embodiment shown in FIGS. 9 through 11, as in the previous embodiment, release lever 72 is pivotally attached to hook body 74 by fastening means 76 disposed through openings 77a, 77b and 78. Although in this embodiment fastening means 76 is depicted as a rivet, one of ordinary skill in the art will recognize that other fastening means are also possible, e.g., a rivet with a bearing sleeve or a nut and bolt combination, and such variations are within the spirit and scope of the claimed invention. Furthermore, this embodiment differs from the first and second embodiments in that gate 84 includes arcuate slots 86a and 86b, i.e., second locking means, disposed opposite each other in gate spaced apart parallel walls 88a and 88b, as opposed to arcuate elevated portions 38a and 38b disposed opposite each other in gate spaced apart parallel walls 36a and 36b. In this embodiment, arcuate slots 86a and 86b further comprise bearing surfaces 94a and 94b, respectively, arranged for locking engagement with a first locking means, e.g., double ended rivet 90.

In this embodiment, the first locking means is double ended rivet 90 which is surrounded by bearing sleeve 92. The ends of rivet 90 are disposed through arcuate slots 86a and 86b. Thus, forces applied to gate 84 are transferred from bearing surfaces 94a and 94b to bearing sleeve 92 and subsequently bearing sleeve 92 transfers the force to inner surface 80 of hook body 74. Although in the embodiment shown in these figures first locking means is rivet 90 surrounded by bearing sleeve 92, one of ordinary skill in the art will appreciate that other locking means may be used, e.g., a double ended rivet without a bearing sleeve, and such variations are within the spirit and scope of the claimed invention.

Gate 84 is maintained in a locked position when release lever 72 is arranged as described above, i.e., first locking means disposed between bearing surfaces 94a and 94b and inner surface 80. Gate 84 is unlocked by pivoting release lever 72 about fastening means 76, thereby disengaging bearing sleeve 92 and bearing surfaces 94a and 94b. Subsequently, gate 84 is opened by pivoting gate 84 about fastening means 98.

Figure 12:
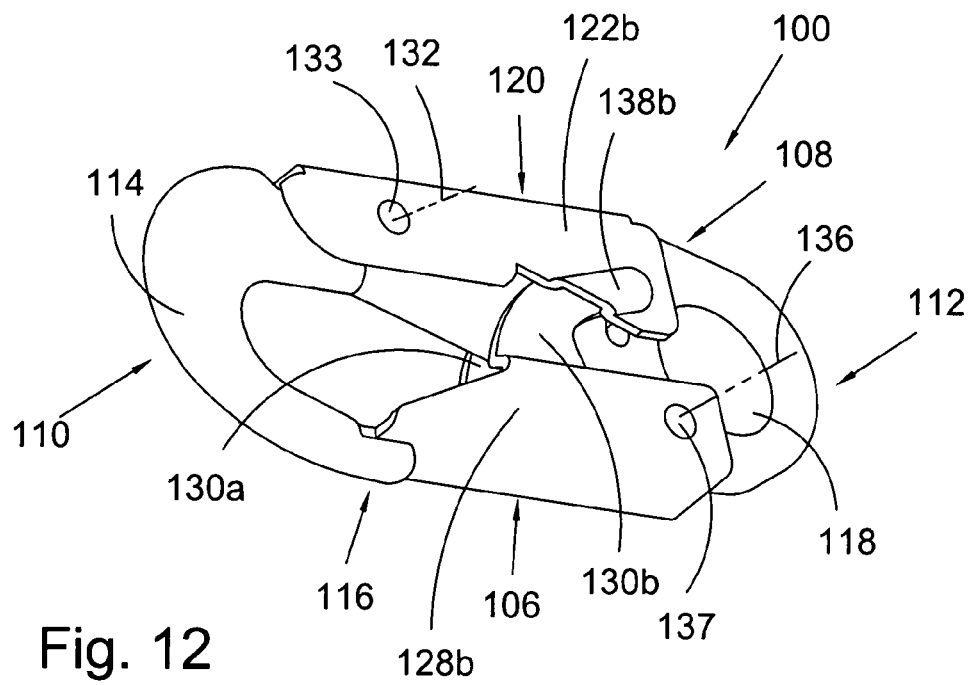
FIG. 12 is a perspective view of a fourth embodiment of a present invention safety hook.
Figure 13:
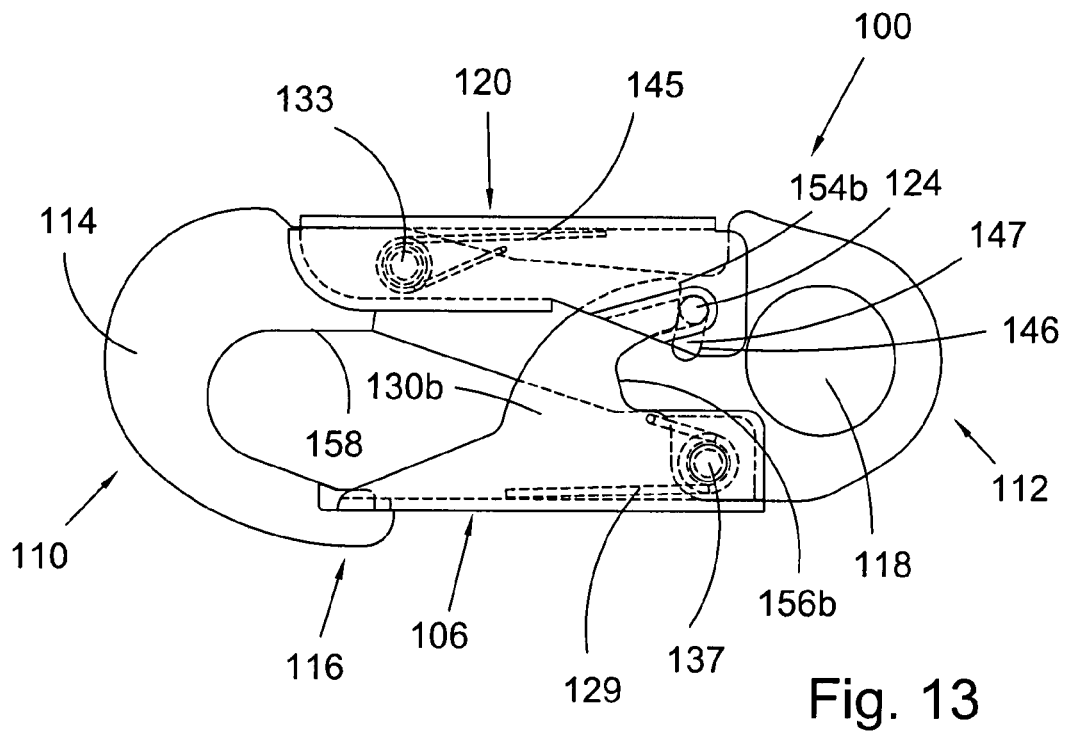
FIG. 13 is a side elevational view of the safety hook shown in FIG. 12 showing internal features in broken lines.
Figure 14:
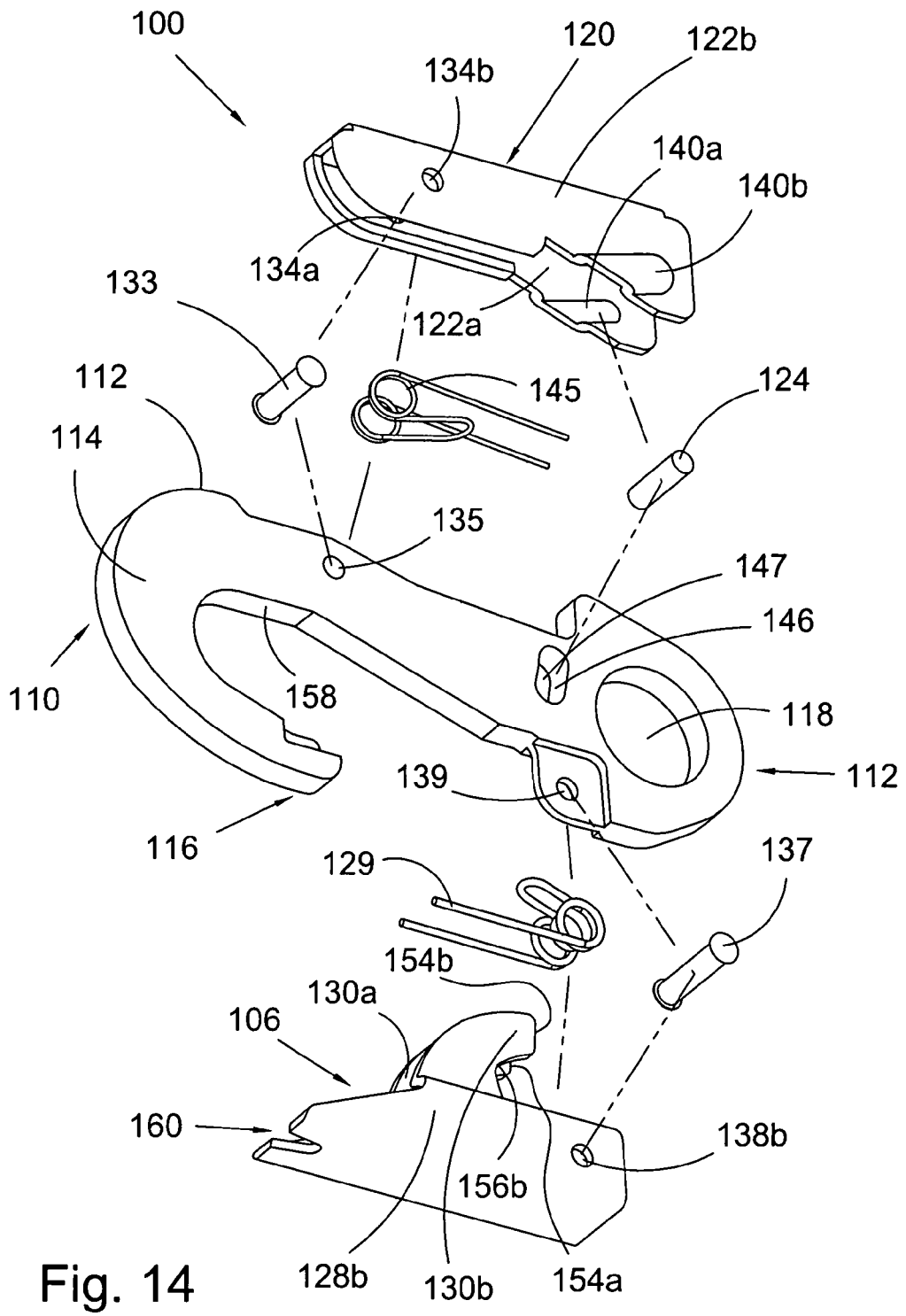
FIG. 14 is an exploded perspective view of the safety hook shown in FIG. 12.
Figure 15:
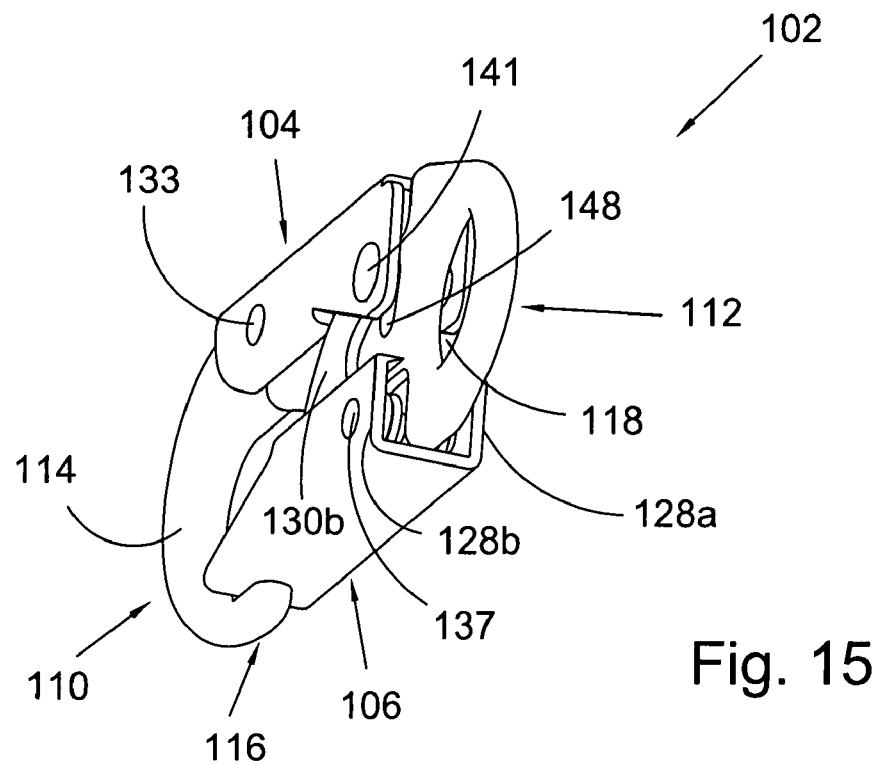
FIG. 15 is a perspective view of a fifth embodiment of a present invention safety hook.
Figure 16:
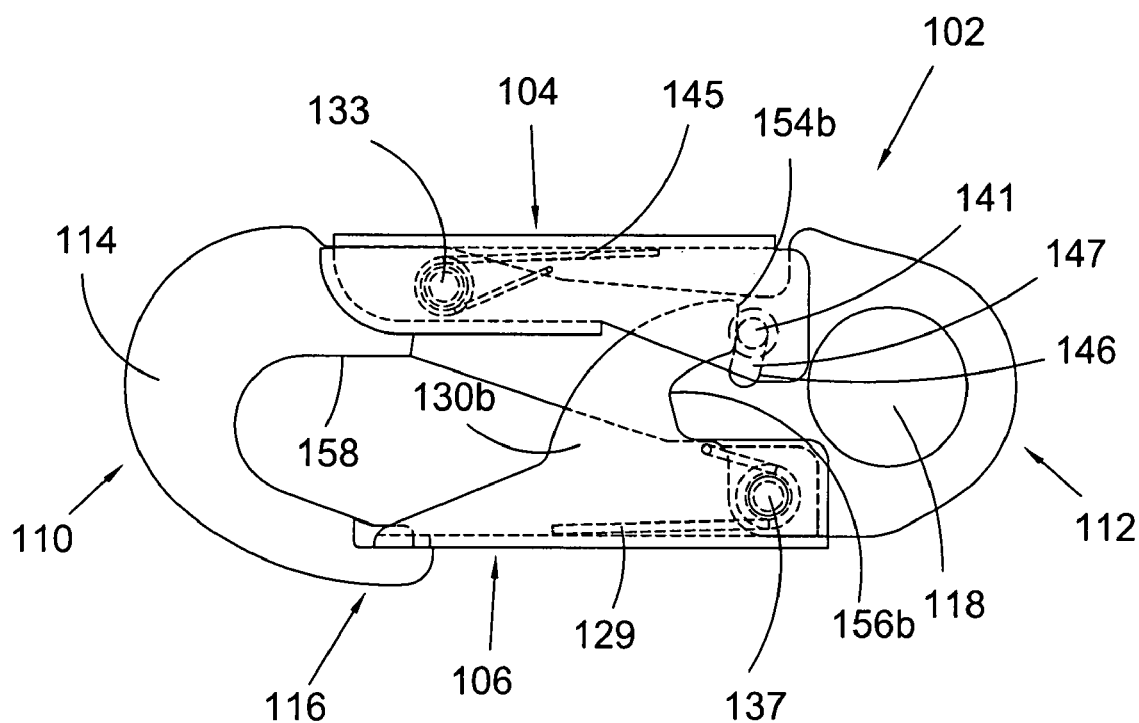
FIG. 16 is a side elevational view of the safety hook shown in FIG. 15 showing internal features in broken lines.
Figure 17:
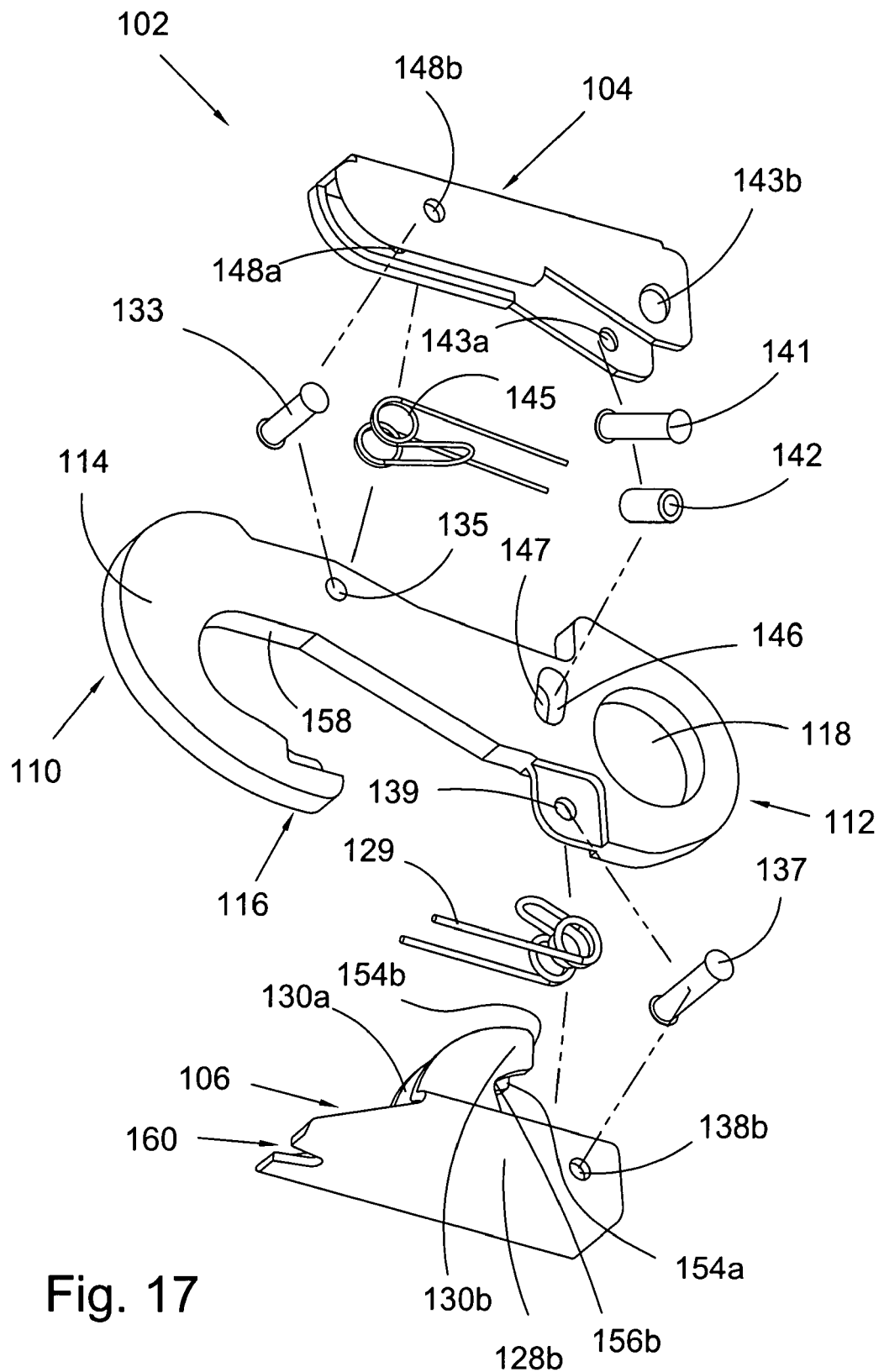
FIG. 17 is an exploded perspective view of the safety hook shown in FIG. 15.
Figure 18:
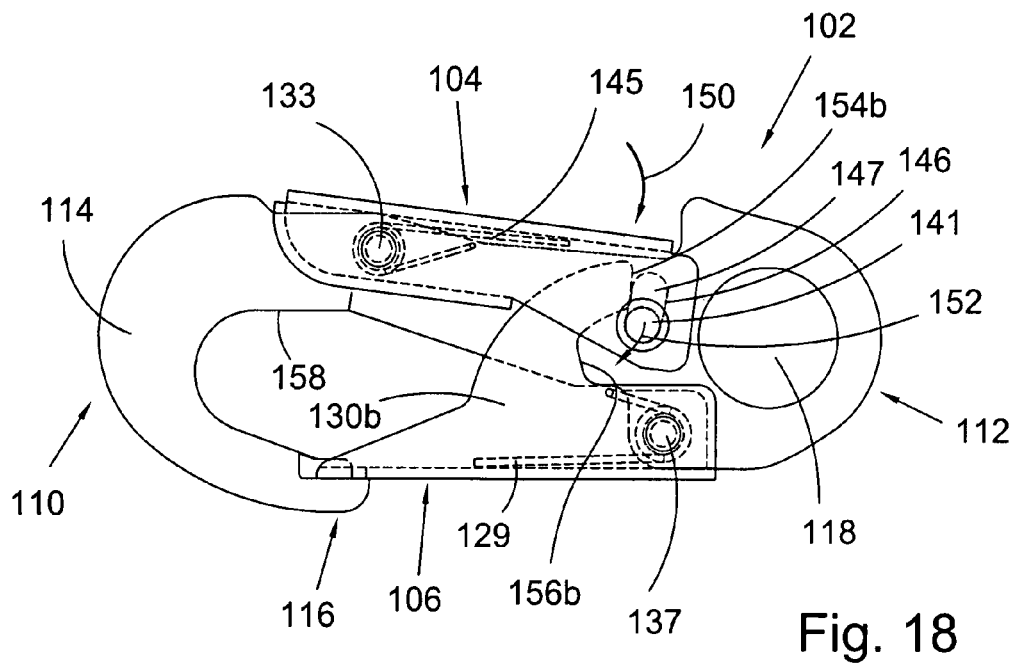
FIG. 18 is a side elevational view of the safety hook shown in FIG. 15 showing internal features in broken lines and having a release lever in an unlocked position; and, FIG. 19 is a side elevational view of the safety hook shown in FIG. 15 showing internal features in broken lines and having a release lever in an unlocked position and a gate in an open position.
Figure 19:
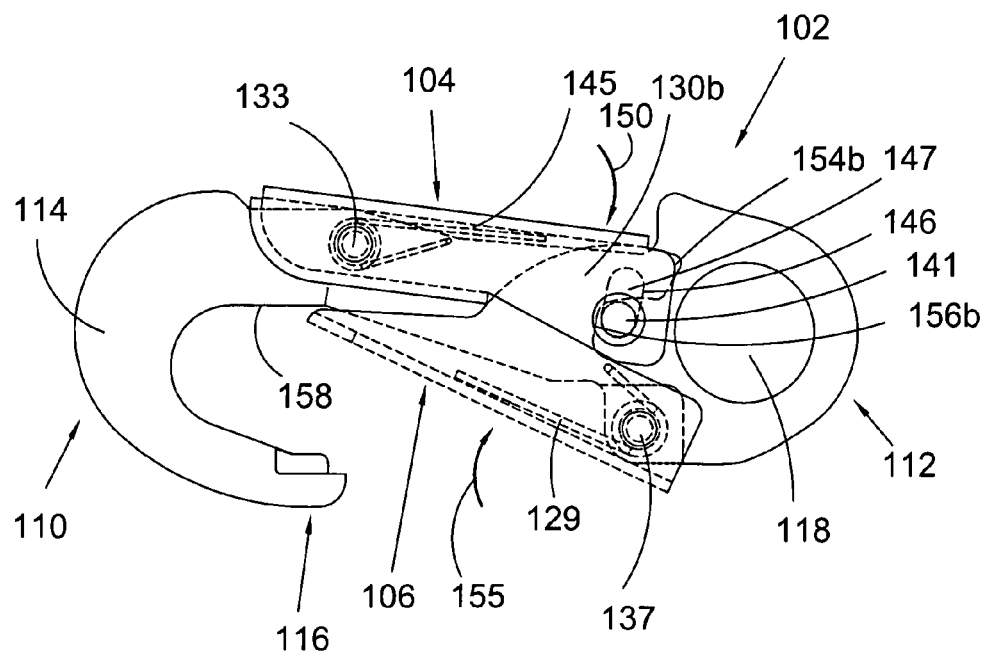

FIGS. 12 through 14 show a fourth embodiment of a present invention safety hook, while FIGS. 15 through 19 show a fifth embodiment of a present invention safety hook. More specifically, FIG. 12 shows a perspective view of safety hook 100, FIG. 13 shows a side elevational view of safety hook 100 showing internal features in broken lines and FIG. 14 shows an exploded perspective view of safety hook 100. Similarly, FIG. 15 shows a perspective view of safety hook 102, FIG. 16 shows a side elevational view of safety hook 102 showing internal features in broken lines, FIG. 17 shows an exploded perspective view of safety hook 102, while FIG. 18 shows a side elevational view of safety hook 102 showing internal features in broken lines and having release lever 104 in an unlocked position and FIG. 19 shows a side elevational view of safety hook 102 showing internal features in broken lines and having release lever 104 in an unlocked position and gate 106 in an open position.

In the embodiment shown in FIGS. 12 through 14, safety hook 100 comprises hook body 108 having first and second ends 110 and 112, respectively. First end 110 comprises bent portion 114 having nose 116, and second end 112 comprises opening 118. Hook 100 further comprises release lever 120 having spaced apart parallel side walls 122a and 122b, and pin 124, i.e., a first locking means. Additionally, hook 100 comprises gate 106 having spaced apart parallel side walls 128a and 128b, wherein side walls 128a and 128b include arcuate wall portions 130a and 130b, respectively, i.e., second locking means. Gate 106 is biased by gate spring 129 to engage nose 116. Arcuate wall portions 130a and 130b are arranged to complimentarily engage pin 124 and gate 106 is arranged to engage nose 116. Similar to the previous embodiments, pivoting of release lever 120 about first rotational axis 132, i.e., fastening means 133 disposed through openings 134a, 134b and 135, disengages pin 124 and arcuate wall portions 130a and 130b, and permits pivoting of gate 106 about second rotational axis 136, i.e., fastening means 137 disposed through openings 138a, 138b and 139. In this embodiment, pin 124 is disposed between elevated portions 140a and 140b of release lever spaced apart parallel side walls 122a and 122b, respectively, and elevate portions 140a and 140b are arranged to secure pin 124 within release lever 120 and hook body 108, i.e., captures pin 124 within hook body 108.

The embodiment shown in FIGS. 15 through 19 differs from the previously described embodiment in that pin 124 has been replaced by double ended rivet 141 and bearing sleeve 142. Rivet 141 is disposed through openings 143a, 143b and 144. Thus, the two embodiments operate according to similar arrangements, which arrangements are perhaps best understood in view of FIGS. 17, 18 and 19. As described supra, hook 102 is maintained in a locked position when release lever 104 is biased by spring 145 so that rivet 141 and bearing sleeve 142 engages arcuate wall portions 130a and 130b of gate 126 and bearing surface 146 of arcuate slot 147 (see FIG. 17). Thus, forces applied to gate 106 are transferred through arcuate wall portions 130a and 130b to bearing sleeve 142, and from bearing sleeve 142 to bearing surface 146. Additionally, due to the arrangement of gate 106 relative to rivet 141, bearing sleeve 142 and fastening means 137, some force is also transferred from gate 106 through fastening means 137. Although in this embodiment, the first locking means is shown as a rivet in combination with a bearing sleeve, one of ordinary skill in the art will recognize that other locking means are also possible, e.g., a rivet without a bearing sleeve, and such variations are within the spirit and scope of the claimed invention.

As described supra, release lever 104 is pivoted about first rotational axis 132, i.e., fastening means 133 disposed through openings 148a, 148b and 135, to release the locking mechanism and thereby permit pivoting of gate 106, i.e., placing safety hook 102 in an unlocked position (see FIG. 19). More specifically, as release lever 104 is pivoted according to arcuate unidirectional arrow 150, rivet 141 is displaced according arcuate unidirectional arrow 152 along arcuate slot 147. Upon pivoting release lever 104 through its full range of motion, i.e., the limit set forth by arcuate slot 147, rivet 141 no longer contacts bearing surfaces 154a and 154b, and therefore gate 106 may freely pivot about second rotational axis 134, i.e., fastening means 137, into an open position according to arcuate unidirectional arrow 155 (see FIG. 19). Also including in this embodiment are stop surfaces 156a and 156b arranged to prevent gate 106 from contacting inner surface 158, thereby preventing damage to notch 160. As described supra, although, stop surfaces 156a and 156b are included in this embodiment, one of ordinary skill in the art will recognize that such stops are not necessary in all hooks, e.g., hooks having pivoting movement of a gate limited by the gate contacting a hook body, and such variations are within the spirit and scope of the claimed invention.

Although in the embodiments shown in the figures, the various first locking means are shown are generally cylindrical pins, rivets or rivets with bearing sleeves, one of ordinary skill in the art will appreciate that other locking means shapes are also possible, e.g., generally rectangular, square or pentagonal parallelepiped, and such variations are within the spirit and scope of the claimed invention. Additionally, one of ordinary skill in the art will appreciate that locking pins may take several forms which include, but are not limited to a captive pin, a rivet or a rivet with a load bearing sleeve. The aforementioned locking pins differ in that a captive pin may be constructed of a material having any hardness and therefore is inexpensive and easy to manufacture; a rivet must be made of a material that can be formed which typically indicates that the material must be of an expensive high-tensile material and the rivet must have a large diameter to absorb 3,500+ lbs of force; and, a rivet with a load bearing sleeve may have a rivet which has a smaller diameter as the hardened sleeve will bear the load, however hardened sleeves are more expensive and increase assembly time. Lastly, one of ordinary skill in the art will recognize that unlike the gate, the release lever does not absorb gate face loads and therefore may be constructed from a lighter material, e.g., metal or plastic.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A hook comprising:
    a hook body having first and second ends, said first end comprises an inner surface, an outer surface and a nose, and said second end comprises an opening, wherein a portion of said inner surface, a portion of said outer surface and said nose define a bent portion;
    a release lever having spaced apart parallel side walls and a first locking means, said first locking means comprises a pin or a double ended rivet, said first locking means arranged adjacent and perpendicular to said inner surface of said hook body; and,
    a gate having spaced apart parallel side walls, said side walls including a second locking means, said gate arranged to engage said nose, said second locking means arranged to complimentarily engage said first locking means, wherein pivoting of said release lever about a first rotational axis disengages said first locking means and said second locking means and permits pivoting of said gate about a second rotational axis further comprising a gate spring, said gate spring biases said gate to engage said nose.

2. The hook of claim 1 wherein said first locking means contacts said inner surface of said hook body.

3. The hook of claim 1 wherein said first locking means contacts said inner surface of said hook body when a force is applied to said gate to pivot said gate about said second rotational axis.

4. The hook of claim 1 wherein said nose further comprises a recessed tongue and said gate further comprises a notch arranged to complimentarily engage said recessed tongue.

5. The hook of claim 1 further comprising a release lever spring, said release lever spring biases said release lever to engage said first and second locking means.

6. The hook of claim 1 wherein each of said release lever spaced apart parallel side walls further comprises an arcuate slot, said arcuate slots arranged opposite each other and said hook body further comprises a double ended rivet arranged through said arcuate slots.

7. The hook of claim 6 wherein a point of contact between said release lever and said outer surface of said bent portion is located along said first rotational axis.

8. The hook of claim 1 wherein said release lever is pivotally attached to said hook body by a fastening means.

9. The hook of claim 8 wherein said fastening means is a pin.

10. The hook of claim 8 wherein said fastening means is a rivet.

11. The hook of claim 1 wherein said second locking means comprises an arcuate slot disposed in each of said gate spaced apart parallel walls, said arcuate slots arranged opposite each other and each of said arcuate slots includes a bearing surface arranged for locking engagement with said first locking means.

12. The hook of claim 11 wherein said first locking means is said double ended rivet disposed through said arcuate slots.

13. The hook of claim 11 wherein said first locking means is said double ended rivet disposed through said arcuate slots, said double ended rivet further comprising a bearing sleeve.

14. The hook of claim 1 wherein said second locking means comprises an arcuate elevated portion disposed in each of said gate spaced apart parallel walls, said arcuate elevated portions are elevated relative to said gate spaced apart parallel walls and arranged opposite each other and each of said arcuate elevated portions includes a bearing surface arranged for locking engagement with said first locking means.

15. The hook of claim 1 wherein said gate is pivotally attached to said hook body by a fastening means.

16. The hook of claim 15 wherein said fastening means is a pin.

17. The hook of claim 15 wherein said fastening means is a rivet.

18. A hook comprising:
    a hook body comprising a slot, a first end and a second end, said first end comprises a bent portion having a nose, and said second end comprises an opening;

a release lever having spaced apart parallel side walls and a first locking means disposed within said slot, said first locking means comprises a pin or a double ended rivet arranged perpendicular to said slot and movement of said first locking means is limited by said slot; and, a gate having spaced apart parallel side walls, each of said side walls includes a second locking means comprising an arcuate wall portion arranged to complimentarily engage said first locking means, said gate arranged to engage said nose, said arcuate wall portions arranged opposite and parallel each other, wherein pivoting of said release lever about a first rotational axis disengages said first locking means and said second locking means and permits pivoting of said gate about a second rotational axis further comprising a gate spring, said gate spring biases said gate to engage said nose.

19. The hook of claim 18 wherein said first locking means is said double ended rivet disposed through said release lever spaced apart parallel side walls.

20. The hook of claim 18 wherein said first locking means is said double ended rivet disposed through said release lever spaced apart parallel side walls, said double ended rivet further comprising a bearing sleeve.

21. The hook of claim 18 wherein each of said release lever spaced apart parallel side walls comprises an elevated portion, said elevated portion is elevated relative to said spaced apart parallel side wall and said first locking means is a pin disposed between said elevated portions.

22. A hook comprising:

a hook body having first and second ends, said first end comprises a bent portion having inner and outer surfaces and a nose, and said second end comprises an opening, wherein said bent portion partially encloses said inner surface;

a release lever having spaced apart parallel side walls and a first locking means, said first locking means comprises a pin, said pin arranged adjacent and perpendicular to said inner surface of said hook body; and, a gate having spaced apart parallel side walls, said side walls including a second locking means, said gate arranged to engage said nose, said second locking means arranged to complimentarily engage said first locking means, wherein pivoting of said release lever about a first rotational axis disengages said pin and said second locking means and permits pivoting of said gate about a second rotational axis further comprising a gate spring, said gate spring biases said gate to engage said nose.

23. The hook of claim 1 wherein said pin comprises a longitudinal axis, and said longitudinal axis is parallel to said first rotational axis.

* * * * *